Oct. 16, 1934.  F. L. SMITH  1,977,019

REAR VISION DEVICE

Filed May 27, 1933

Inventor
Frank L. Smith
By Jans, Addington, Ames & Field
Attys.

Patented Oct. 16, 1934

1,977,019

UNITED STATES PATENT OFFICE 1,977,019

REAR VISION DEVICE

Frank L. Smith, Oak Park, Ill.

Application May 27, 1933, Serial No. 673,183

4 Claims. (Cl. 45—97)

This invention relates to reflecting devices for automobiles or other vehicles, and has special reference to a system of rear vision mirrors.

More particularly, this invention relates to a rear vision device by means of which the operator of the automobile or other vehicle to which it is attached may see to either side and to the rear of the automobile. The device may comprise an angular or V-shaped mirror positioned in front of the driver and a mirror positioned at each side of the car outwardly of the body portion, these side mirrors being adjusted to reflect the images of the objects reflected therein onto the V-shaped mirror so that, by looking into the mirror in front of the operator, objects rearwardly of the mirrors alongside or behind the car may be seen.

The present invention is particularly designed for use in closed automobiles. In these, with the usual type of rear vision mirror, it is only possible to see directly behind the automobile through the rear window, making it necessary for the driver to turn his head to see objects to the side and rear. Even then, there is a blind spot at each rear corner of the automobile where no objects may be seen by the driver either in the rear vision mirror or by turning his head. This frequently makes it impossible to see approaching automobiles, and is the cause of many accidents. With the present invention, these blind spots are removed, and it is possible to see to the sides and rear of the automobile by merely glancing in the V-shaped mirror positioned in front of the driver.

An object of the present invention is to provide a rear vision device which will enable the operator of the vehicle to see to both sides of the car as well as to the rear of the same.

A further object of this invention is to provide a device of this kind which may be rendered glareproof.

Still another object is to provide a rear vision device of the type above referred to which is of simple and inexpensive construction and may be easily installed in an automobile or other vehicle.

Further objects and advantages will be apparent from the following description, when taken together with the accompanying drawing, in which latter:

Figure 1:
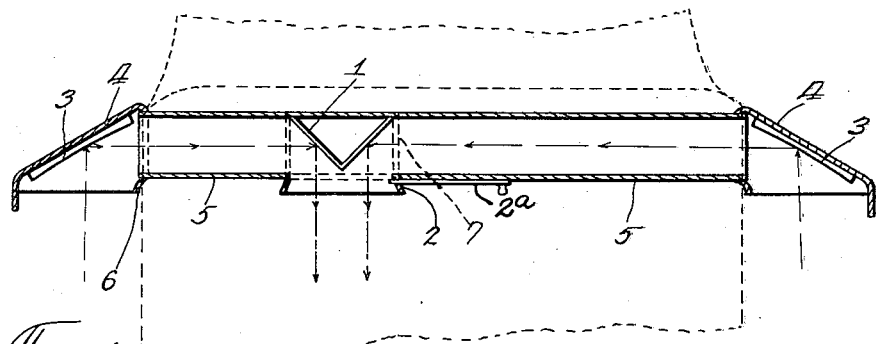
Figure 1 is a horizontal cross sectional view of one form of device that may be employed.
Figure 2:
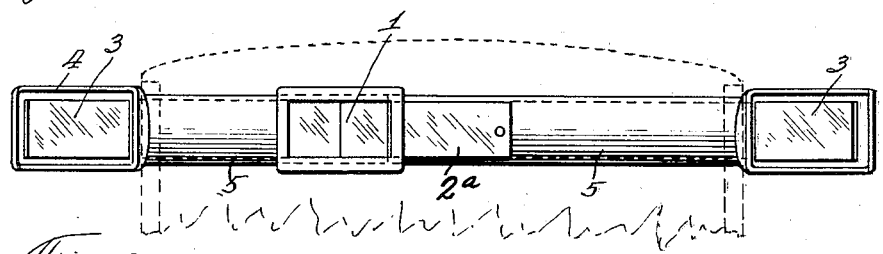
Fig. 2 is a rear elevational view of the device shown in Figure 1.

Referring more particularly to the drawing, there is shown a V-shaped mirror 1 for being mounted in front of the driver's seat of an automobile adjacent the top thereof in the locality where rear vision mirrors are usually placed. The mirror may be positioned in a view box 2 which is fastened to the automobile by any desirable means. The view box is not essential, as the mirror 1 may be secured directly to the car above the windshield in a manner well known in the art so that the mirror may be adjusted at will. A sliding cover 2a may be provided in the view box. A mirror or reflecting surface 3 may be positioned at each side of the car outwardly thereof, which mirrors are adjusted to focus onto the opposite sides of V-shaped mirror 1. Hoods 4, to which the mirrors 3 may be attached, are provided on the outside of the car, preferably above the doors thereof. The hoods serve to protect the mirrors 3 from the elements and also from the sun's rays, unless the sun is only a little above the horizon. The upper portion of the hood 4 preferably extends a distance to the rear of the mirrors 3.

If the device is employed in a sedan, it may be preferable to position the reflecting surfaces 3 between the front and rear doors but above the same, as this is usually the widest part of a sedan. In a coupé, the mirrors 3 may be positioned on the sides preferably adjacent the rear. It is understood, however, that the side mirrors may be located where desired.

Tubes 5 are positioned between the hoods 4 and the V-shaped mirror 1 to provide a passageway through which the rays from mirrors 3 pass before being reflected by the V-shaped mirror 1. The tubes 5 are preferably positioned adjacent the top of the car on the inside thereof and may be secured to the ribs or framework for the top. It is preferable to cut grooves in the ribs, in which grooves the tubes 5 are positioned so that they do not extend below the flexible covering usually placed adjacent the underside of the ribs. However, as the tubes terminate at their forward end adjacent the V-shaped mirror 1, which is below the flexible covering, it has been found desirable to improve the appearance of the interior of the car by extending the flexible covering downwardly to the V-shaped mirror 1 on each side thereof. Thus, the tubes 5 are concealed from view throughout substantially their whole length.

Figure 3:
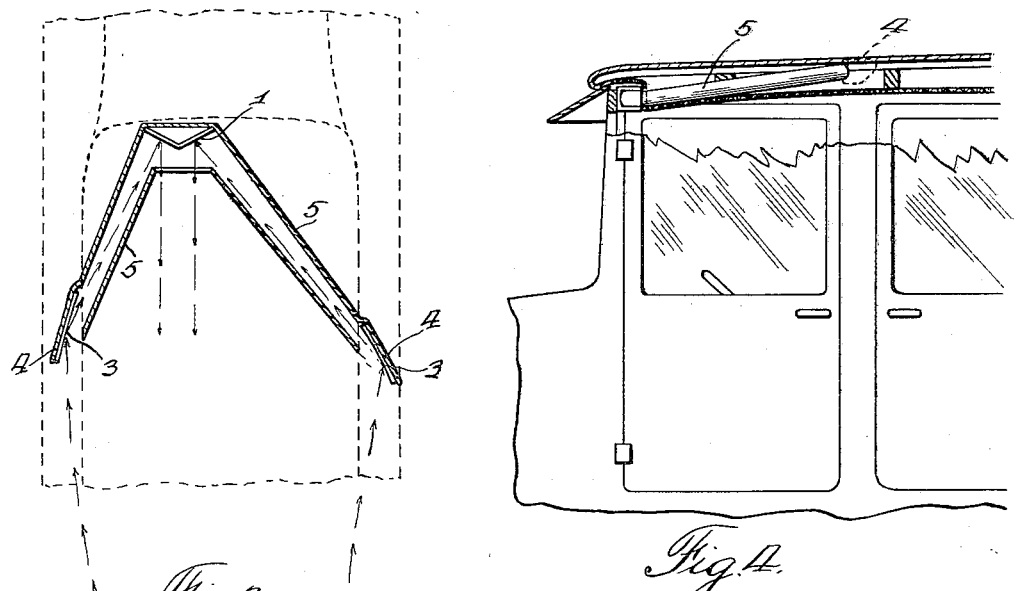
Fig. 3 is a horizontal cross sectional view of another form of device embodied in the present invention, in which the side mirrors are positioned substantially at the widest portion of the car.
Figure 4:
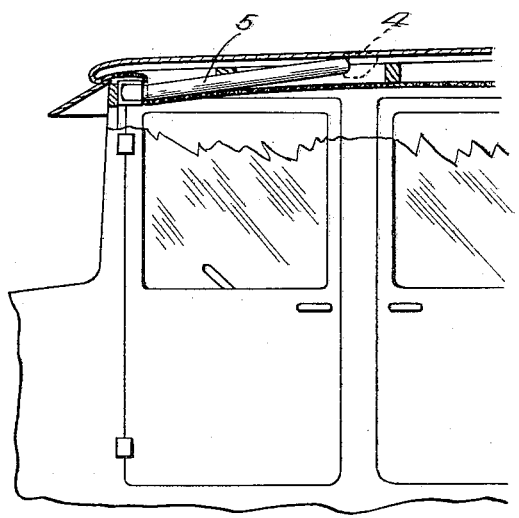
Fig. 4 is a side elevation of the device shown in Fig. 3 when mounted on an automobile.

In the form of device shown in Fig. 1, in which the mirrors 3 are substantially alined with the V-shaped mirror 1, the mirrors 3 may be flat surfaces. However, in order to broaden the field of vision, it has been found desirable to make the mirrors 3 slightly concave. The curvature of these mirrors is such that the field of vision covered by the apparatus may encompass a sector which extends directly behind the mirrors, to the rear of the car, and also a distance on each side of the car. The use of concave mirrors is particularly desirable when the form of device shown in Fig. 3 is employed with the mirrors 3 positioned at substantially the widest part of the car.

It may be advantageous in certain instances to provide focusing lenses 6 in the outer ends of the tube for focusing the rays from the mirrors 3 onto the V-shaped mirror 1.

It is possible to prevent any glare from the headlights of cars to the rear of the device by various means, such as using darkened mirrors in the V-shaped mirror 1 or providing a colored glass 7 adjacent the inner ends of the tubes 5.

Thus, with an apparatus of the character described, the operator of an automobile may, by looking into the V-shaped mirror 1, see objects on either side of the car as well as to the rear thereof, thus making for greater safety in driving.

While I have shown and described the preferred embodiments of the present invention, it will be apparent to those skilled in the art that various modifications may be made without departing from the spirit of the invention, and, therefore, I wish to be limited only by the scope of the prior art and the appended claims.

I claim:

1. The combination with an automobile having a body of the closed type of a V-shaped mirror positioned forward of the driver and in his line of vision and a reflecting surface positioned on each side of the automobile substantially to the rear of the driver and extending outwardly from the sides of said automobile, said reflecting surfaces being arranged to reflect images of objects to the rear and sides of said automobile onto said mirror whereby the driver may see to either side of the automobile and to the rear thereof.

2. The combination with an automobile having a body of the closed type of a V-shaped mirror positioned forward of the driver and in his line of vision, a tubular member positioned on each side of said mirror and extending from said mirror outwardly and rearwardly to the sides of said car substantially to the rear of said driver, and a reflecting surface positioned adjacent the outer end of each of said tubular members and extending outwardly from the sides of said car, said reflecting surfaces being arranged to reflect images of objects to the sides and rear of said automobile through said tubular members and onto said mirror whereby the driver may see to either side of the automobile and to the rear thereof.

3. The combination with an automobile having a body of the closed type of a V-shaped mirror positioned forward of the driver and in his line of vision, a tubular member positioned on each side of said mirror and extending from said mirror outwardly and rearwardly to substantially the widest portion of said body, and a reflecting surface positioned on each side of said body adjacent the outer ends of said tubular members and extending outwardly of said body, said reflecting surfaces being arranged to reflect images of objects to the rear and sides of said automobile onto said mirror whereby the driver may see to either side of the automobile and to the rear thereof.

4. The combination with an automobile having a body of the closed type of a V-shaped mirror positioned forward of the driver adjacent the top of said body and in his line of vision, a tubular member positioned on each side of said mirror and extending from said mirror outwardly and rearwardly to the sides of said car substantially to the rear of said driver, said tubular members being substantially concealed within the roof of said body, and a reflecting surface positioned on each side of said body adjacent the outer ends of said tubular members and extending outwardly from said body, said reflecting surfaces being arranged to reflect images of objects to the rear and sides of said automobile through said tubes onto said mirror whereby the driver may see to either side of the automobile and to the rear thereof.

FRANK L. SMITH.